US005399413A

United States Patent [19]

Katsen et al.

[11] Patent Number: 5,399,413

[45] Date of Patent: Mar. 21, 1995

[54] HIGH PERFORMANCE COMPOSITE AND CONDUCTIVE GROUND PLANE FOR ELECTROSTATIC RECORDING OF INFORMATION

[75] Inventors: Boris J. Katsen, Longmeadow; Dene H. Taylor, Holyoke; Richard S. Himmelwright, Wilbraham; Cynthia F. Klausner, Hadley; Edward W. Sporbert, Chicopee; Barbara J. Stewart, Springfield; John Cavanaugh, Easthampton; Eran Turi, Springfield, all of Mass.

[73] Assignee: Rexham Graphics Inc., South Hadley, Mass.

[21] Appl. No.: 54,214

[22] Filed: Apr. 30, 1993

[51] Int. Cl.[6] ............ B32B 3/00

[52] U.S. Cl. ............ 428/195; 428/206; 428/211; 428/221; 428/323; 428/325; 428/409; 428/411.1

[58] Field of Search ............ 428/211, 323, 511, 512, 428/513, 195, 325, 328, 409, 206, 221, 411.1; 346/135.1

[56] References Cited

U.S. PATENT DOCUMENTS

| | | | |
|---|---|---|---|
| 3,657,005 | 4/1972 | Brown, Jr. et al. | 117/201 |
| 4,373,013 | 2/1983 | Yoshizumi | 428/570 |
| 4,752,522 | 6/1988 | Sugimori et al. | 428/211 |
| 4,783,389 | 11/1988 | Trout et al. | 430/137 |
| 4,795,676 | 1/1989 | Maekawa et al. | 428/328 |
| 4,840,842 | 6/1989 | Yamaguchi et al. | 428/323 |
| 4,904,526 | 2/1990 | Koskenmaki | 428/328 |
| 5,087,517 | 2/1992 | Sagawa et al. | 428/329 |
| 5,116,666 | 5/1992 | Konno | 428/220 |
| 5,126,763 | 6/1992 | Atherton et al. | 346/135.1 |
| 5,130,177 | 7/1992 | Lu et al. | 428/195 |
| 5,140,450 | 8/1992 | Nikaido | 359/82 |
| 5,179,065 | 1/1993 | Ito | 503/202 |
| 5,192,613 | 3/1993 | Work, III et al. | 428/363 |
| 5,192,631 | 3/1993 | Inoue et al. | 430/56 |
| 5,194,352 | 3/1993 | Obata | 430/48 |

OTHER PUBLICATIONS

Lubo Michaylov, "Dielectric Papers and Films", Handbook of Imaging Materials, Arthur S. Diamond ed., pp. 253–295, Diamond Research Corporation, Ventura, Calif.

Gene F. Day, "Fundamentals of Electrostatic Plotters", pp. 1–12, Phoenix Precision Graphics.

Hoekman et al., "Electrographic Response of Multi-Stylus Printer/Plotters Using Dielectric Coated Paper", pp. 80–83, vol. 60, No. 5, May 1977/Tappi.

Ray A. Work, Imaging Materials Seminar Series, Session 8, "New Media Technology For Non-Impact Printing", Sixth Annual Specialty Paper and Film Conference.

John B. Fenn, Jr., Ninth Annual Specialty Papers & Films Conference & Tutorial, Session 7, "Vacuum De- (List continued on next page.)

*Primary Examiner*—Patrick J. Ryan
*Assistant Examiner*—William A. Krynski
*Attorney, Agent, or Firm*—Burns, Doane, Swecker & Mathis

[57] ABSTRACT

Provided is a composite material comprising a carrier, a conductive layer formed on the carrier, and a dielectric layer containing spacer particles formed on the conductive layer. The dielectric layer has an abrasion factor less than about 0.3 determined by a brass shim abrasion method, and a substantially uniform distribution of spacer particles substantially free of flat spots greater than about 100 microns in the x-y direction and 1500 square microns in area on any part of the surface. The spacer particles of the dielectric layer of the composite material preferably are amorphous silica. The composite material is useful in electrostatic imaging technology and provides images substantially free of defects, including artifacts or flares, dropouts and nib writing.

Also provided is a process which permits the creation of very stable dispersions of solid particles in a dispersing medium useful for both the dielectric and conductive layers of the composite material of the invention.

A white or colored conductive ground plane is also provided.

43 Claims, 2 Drawing Sheets

OTHER PUBLICATIONS posited Films For Reprographics—An Update", Feb. 21–24, 1993, Hilton Head Island, S.C.

D. B. Ghare, "Tin Oxide Based Semiconducting Paints and Their Electrical Properties", *Indian Journal of Technology,* vol. 15, Feb. 1977, pp. 67–70.

Rao et al., "Electrical Conduction in Pure and Doped Poly(acrylamide) Films", *Acta Polymerica* 42, 1991, Nr. 9, pp. 465–468.

CA 116:32190s, Mamunya et al., "Description of the Electric Conductivity of Highly Filled Polymer Composites Using The Dynamic Cluster Model", Chemical Abstract Selects: Conductive Polymers, Issue 3, 1992, p. 4.

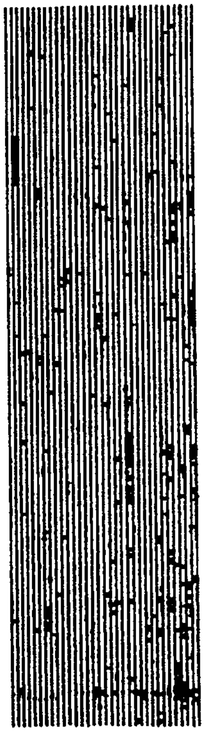
FIG. 1
FIG. 2
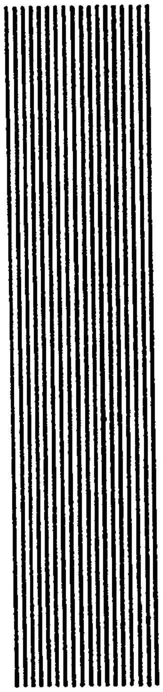

HIGH PERFORMANCE COMPOSITE AND CONDUCTIVE GROUND PLANE FOR ELECTROSTATIC RECORDING OF INFORMATION

FIELD OF THE INVENTION

The present invention relates to a multilayer composite for use in electrostatic imaging or electrographic recording technology. More specifically, the present invention relates to a novel composite material for high speed electrostatic recording which is substantially free from defects such as artifacts or flares, untoned spots, line breaks, dropouts or missing data, unwanted toning of the surface of imaging material, glitches, mechanical and electrical nib writing, ghosting, and excessive wear of the writing head, ground electrodes (shoes) and other parts of the plotters used in this technology. The present invention also relates to a novel humidity insensitive ground plane, and a novel impingement process which can be used to prepare the conductive layer of such ground plane. The present invention further relates to a ground plane which can exhibit various colors, including white when combined with a white paper or film carrier layer.

BACKGROUND OF THE INVENTION

Electrostatic recording is the process of producing an image in the form of an electrostatic charge pattern on a dielectric surface and subsequently developing that latent image by toning with oppositely charged black or colored powder, usually colloidally suspended in an insulating liquid.

In a typical writing or imaging process, a writing head, which contains two or more rows of densely spaced styli and a backplate or frontplate electrode, is selectively programmed by the plotter logic to place minute dot-spaced electrostatic charges in latent image form on the recording medium. This medium is designed to receive and hold an electrostatic charge pattern. After the latent image is electronically placed on the medium, the medium is exposed to a liquid toner. Black or colored particles suspended in the toner vehicle adhere to the medium only where a previous electrostatic charge was placed. Excess toner is removed from the medium by a vacuum channel or wiper bars and the medium is then dried by forced air, thereby fixing the image to the medium. This electronically produced print is often referred to as a hardcopy.

Although various recording media have been proposed for use with electrostatic recording plotters or printers, none of them has satisfied fully the substantial need in the art, particularly for use with electrostatic recording devices such as the Benson (Océ Graphics) plotter, Versatex VS 3000 Series, 7000 Series, 8500 Series and 8500-HR Series plotters, CalComp 5700, 5800, 67000 and 68000 Series plotters and HP 7600 Series plotters. In fact, there are many deficiencies in the known products which have considerably limited their commercial utility.

Some of the main image defects which often are experienced in electrostatic recording are artifacts or flares, image breakup or dropouts and glitches. Flares are randomly occurring bursts or explosions in plotter lines due to abnormal electrostatic discharge. Dropouts are defined either as missing dots in continuous lines or in single dot patterns (half tones), or as dots missing in a specially recorded quadrant, consisting of 51 rows of 50 single dots in a row, as in a test plot performed in a CalComp 68436 color plotter. Glitches are irregular specks or non-uniform images occurring in solid dark images due to irregularities in the dielectric surface of the media.

Another defect commonly seen is mechanical and electrical nib writing which causes dark areas on the image.

Additional image problems may occur with conventional recording media because of humidity changes during use since the media is inherently moisture sensitive. This sensitivity to changes in humidity may result in repeated images or lines (ghosting) and low image density.

Various attempts to provide adequate electrostatic recording media have been made, none of which have satisfactorily solved the above problems while providing a clear, dense image.

U.S. Pat. No. 3,657,005, issued to Clevite Corporation, deals with the need to establish a controlled gap between the flat surface of a charging device and the area on the surface of the electrographic recording media where the latent image is formed. The '005 patent also specifies the frequency of the spacers per certain square area, such as 1 to 10 spacer means per 100 square rail of surface, with the spacers projecting from 0.05 to 0.4 mil above the recording media. Glass shot, starch, refractory particles and plastic particles are recommended as spacers. The simple mechanistic approach of designing a 3-D imaging space, as in '005 patent, addresses only the requirements imposed by the physics of latent charge formation on the flat surface of the dielectric materials. However, the '005 patent does not deal with humidity independent conductive layers and does not describe any composites containing carriers other than paper based media.

U.S. Pat. No. 4,752,522, issued to Mitsubishi Rayon Co., deals with the application of spacers using an insulating resin of specific volume resistivity at a narrow average particle size from 1.5 to 4 μm and limiting particles of 8 microns and more in size to 0.02% by number in the distribution. The '522 patent describes the use of certain types of polymeric materials such as copolymers of acrylonitriles and styrene as the spacer particles and puts a limitation on the design of the electrostatic media both in terms of the materials to be employed and in limiting the upwards protrusion height in a range similar to U.S. Pat. No. 3,657,005. The only quality issues which are addressed are line dropouts, pen writability and image density and most of the findings in this patent are specific only to acrylonitrile-styrene copolymers used as spacers.

U.S. Pat. No. 4,795,676, issued to Oji Paper Co., deals with a composite dielectric material, including a support, that is formed of a multilayered sheet of synthetic paper and which has an electroconductive layer and a dielectric layer. The support has a surface layer formed of a thermoplastic resin film containing 0–3 wt. % of an inorganic fine powder and a paper-like layer which is made from a thermoplastic resin film containing from 8 to 65% by weight of inorganic filler (fine powder). The paper-like layers are formed on both sides of a stretched film base. The support contains no more than 50 elevations per 0.1 $m^2$ that project upwards for 10 microns or more from the flat side of the surface layer. Despite the cumbersome structure of the composite design, image density of the hard-copy resulting from the composite of the '676 patent does not exceed 1.1–1.2 units of optical density, which is only a minimum acceptable density. Further, material produced by the '676 patent is made with a humidity sensitive conductive base and possesses all of the negative properties related to the fluctuations of the resistance of a conductive ground plane with the change of relative humidity.

U.S. Pat. No. 5,116,666, issued to Fuji Photo Film Co, deals with a composite consisting of insulating film, a conductive layer and a dielectric layer, which includes conductive fillers in the form of fibrous conductive powders.

U.S. Pat. No. 5,130,177, issued to Xerox Corp., discloses a conductive coating composition consisting of a quaternary ammonium compound deposited on one side of the paper and a dielectric coating composition on the other side of the paper. The basic objective of the '177 patent is to provide a paper suitable for electrostatic recording which has minimum curl, is less humidity dependent and is flexible. The '177 patent connects paper stiffness (flexibility) with the image quality in order to improve line dropout. However, as taught in column 12, lines 25 to 35, the surface resistivity changes from 0.11 Mohm/sq at 71% R.H. to 2.5 Mohm/sq at 24% R.H., an order of magnitude change which is totally unacceptable, for example, when opaque matte or transparent electrographic film is to be manufactured.

U.S. Pat. No. 5,192,613, issued to E. I. du Pont de Nemours and Company, introduces a humidity insensitive electroconductive layer having a conductive powder consisting of amorphous silica or a silica-containing compound surface coated with a two dimensional network of antimony-containing tin oxide crystallites. Both dielectric and conductive layers are the same cross-linked polymers, having a preferred powder to polymer ratio of about 0.6 to about 1.3. The use of polyfunctional aziridines such as PFAZ® 322 or XAMA-7, containing residual highly toxic and dangerous ethyleneimine is an undesirable feature of the design. Another disadvantage of the '613 patent is the relative hiding power of the core or shell design for conductive powders, which makes it difficult to use for the design of transparent hard copy.

U.S. Pat. No. 5,194,352, issued to Dai Nippon Printing Co., teaches a toned image of high fidelity by a contact between two films, one electrostatic and another photosensitive, positioning both of them within a boundary of a predetermined gap, and imaging the electrostatic layer via exchange exposure through the transparent photosensitive layer and then submerging the film with developed latent image into a toner. When both films are submerged into a toner, positive and negative images are obtained. Thus, the '352 patent requires two types of media, one known as media for transparent electrophotography (TEP) and the other one conventional dielectric imaging material.

U.S. Pat. No. 5,126,763, issued to Arkwright Inc., describes a multilayer polymeric film composite for use in the electrostatic recording process. It specifies a surface abrasivity of about 0.015 inch to about 0.085 inch and a surface roughness of about 30 to about 180 cc of air/minute and teaches the use of an electronically conductive layer containing at least one electronically conductive particulate in at least one polymer binder deposited beneath the dielectric layer with the specified roughness. This design has many significant deficiencies, which were discovered during intensive studies by the inventors. Among them are a gray cast of the film, an extremely excessive electrical background, when material is imaged especially, but not only, on Capricorn Plotters, as for example, CalComp 68436 series, a high level of artifacts expressed as flares, and a wider than optimal line width. Moreover, the '763 patent teaches the use of crystalline silica. The presence and use of materials known to cause lung cancer and silicosis such as crystalline silica is clearly unacceptable at the present level of medical and environmental science. Additionally, the abrasion level advocated by the '763 patent is detrimental to the state of the print head as it is gradually abraded away by hard abrasive pigments, such as crystalline silica.

Though the above patents address many questions in latent image formation, print quality and favorable interaction of media and plotter, there is still a need in the art to provide a media material which can store a highly intense latent image charge, provide a high image density after toning when Dmax is above 1.3, and provide good grounding conditions for the return of writing current to the electrical ground. A desirable media material will also employ a humidity independent conductive ground plane for opaque, matte and transparent paper, vellum, film and fabric and provide an optimized air gap for the Paschen discharge. Further desirable properties include minimization of flares and dropouts and prevention of filming, including aid in cleaning the print head of polymeric deposits and inorganic oxides. Other desirable properties include high toner adhesion, good archival characteristics and use of safe chemical compounds and procedures, avoiding noxious or smelly material, toxic chemical, carcinogenic or mutagenic compounds.

Thus, there is a need in the art to provide a high performance, high speed dielectric recording media substantially free of the disadvantages, defects and limitations of the materials disclosed in the art.

An object of the present invention is to provide a technology which utilizes unique and appropriate chemicals, compounds and procedures which will result in the manufacture of high fidelity, high resolution electrostatic imaging material.

Another object of the invention is to produce an electrostatic imaging material with smallest possible dot size, i.e., a high resolution product.

Yet another object of this invention is to produce a material which shows little or no dropouts.

Another object of the present invention is to provide a humidity insensitive transparent film of a high quality electrostatic recording.

Another object is to provide a matte film of a high quality electrostatic recording.

Another object of this invention is to provide a humidity insensitive white paper or film product for electrostatic recording of high quality.

A further object of this invention is to provide a matte film for a high quality electrostatic recording which consists of a dielectric layer, a conductive layer, a transparent polyester support and a matted antistatic coating.

An additional object of this invention is to provide low flare electrostatic recording media.

Another object of this invention is to produce a media with a diminished number of white spots. A white spot is a circular untoned area with a diameter greater than 1 mm.

Yet another object of this invention is to provide a composite for dielectric recording with high thermal stability, allowing full removal of residual solvents.

A further object of this invention is to provide a dielectric layer having low abrasion characteristics, as defined by a brass shim abrasion method, described below, as well as by the method described in U.S. Pat. No. 5,126,763, in order to provide less abrasion to the print head.

A further object of this invention is to provide a dielectric recording media of archival quality, i.e., with high resistance to scratching, excellent toner adhesion, high moisture resistance, etc.

A further object of this invention is to provide a high quality material, with a low level of electrical background, i.e., with an imperceptible nib writing level.

Still another object of the present invention is to provide a conductive ground plane which can utilize extremely low levels of dopant for the electronically conductive particulate.

Yet another object of the present invention is to provide a white ground plane which exhibits a conductivity in the range of from 1 to 10 Mohms/sq. Still another object of the present invention is to provide conductive ground planes in various colors.

Yet another object of the present invention is to provide a novel impingement process for the preparation of an electrically conductive layer wherein the electronically conductive particulate is reduced to a nanoscale size.

These and other objects of the present invention will become apparent upon review of the following specification, the drawing and the claims appended thereto.

SUMMARY OF THE INVENTION

In accordance with the foregoing objectives, there is provided by the present invention a composite material having a carrier, a conductive layer formed on the carrier and a dielectric layer containing spacer particles formed on the conductive layer. The dielectric layer has an abrasion factor less than about 0.3 determined by a brass shim abrasion method and a substantially uniform distribution of spacer particles substantially free of flat spots greater than about 100 microns in the x-y direction and about 1500 square microns in area on any part of the surface. Such a composite is useful in electrostatic imaging technology.

In a preferred embodiment, the spacer particles are nonabrasive silica, particularly amorphous silica. In an even more preferred embodiment, the amorphous silica is used in conjunction with clay or calcium carbonate or a combination thereof.

It is also preferred that the topographical surface roughness is less than about 0.85 microns and the abrasion factor is less than about 0.2 determined by a brass shim abrasion method.

Also provided by the present invention is a composite material having a carrier, a conductive layer, and a dielectric layer which provides an image with more than 90% of the dots of a size between about 100 and about 200 microns when the composite is used with a 400 dot/inch plotter.

In another embodiment of the present invention, them is provided a whim conductive ground plane comprised of a whim carrier and an electrically conductive coating. The electrically conductive coating is comprised of doped tin oxide, doped indium oxide or indium tin oxide electronically conductive particulates. Such ground planes are relatively humidity independent and the conductivity of the ground plane, despite being white, can be in the range of from about 1 to 10 Mohm/sq. The white carrier can be any suitable white substram, preferably paper or a whim film.

In still another embodiment of the present invention, them is provided a colored conductive ground plane comprised of a carrier and an electrically conductive coating. The electrically conductive coating is comprised of an electronically conductive particulate and an acid developable dye of the color of the ground plane. The ground plane can be transparent and colored while exhibiting a suitable conductivity for applications such as a dielectric ground plane, an antistatic ground plane or an electrostatic dissipation device.

In another embodiment of the present invention, a process is provided which permits the creation of very stable dispersions of solid particles in a dispersing medium. The medium can be aqueous or nonaqueous. The process can be used in preparing the dielectric layer, as well as a conductive layer of the high performance composite of the present invention.

The process comprises subjecting solid particles to a dry impingement mill. The impinged particles are then dispersed in a dispersion medium by first adding from 5 to 30% of a binder to the medium, and then adding the solid particles. Once the solid particles have been added and dispersed, the remaining amount of the binder is then added. The resulting dispersion is surprisingly stable, both for noncolloidal particles as well as colloidal particles.

The process finds particular applicability in the preparation of a conductive layer of the present invention, as the dispersion of electronically conductive particles can be subjected to a wet impingement mill to further reduce the particle size prior to the addition of the remaining amount of the binder. The use of the wet impingement mill results in an extremely stable colloidal dispersion of the electronically conductive particles in the dispersion medium. Such a use of a first dry powder impingement, and subsequently the wet impingement mill is hereinafter referred to as the dry impingement/wet impingement process of the present invention. Optionally, separation or classification of the particles can subsequently be made if desired.

The dry impingement/wet impingement process is useful for preparing conductive ground planes with doped tin oxide, doped indium oxide or indium tin oxide electronically conductive particulates which are essentially colorless, or white when coated over a white carrier. It has been found that the process allows one to use doping materials in relatively low amounts, e.g., as low as 0.4 weight percent, yet still achieve sufficient conductivity, e.g., in the range of from 1 to 4 Mohm/sq., to be useful in many electroconductive applications.

BRIEF DESCRIPTION OF THE DRAWINGS

FIG. 1 is a fine line image recording by an electrostatic recording medium obtained commercially from Arkwright, Inc.

FIG. 2 is a fine line image recording made using the composite material of the present invention.

DETAILED DESCRIPTION OF THE PREFERRED EMBODIMENTS

Figure 3:
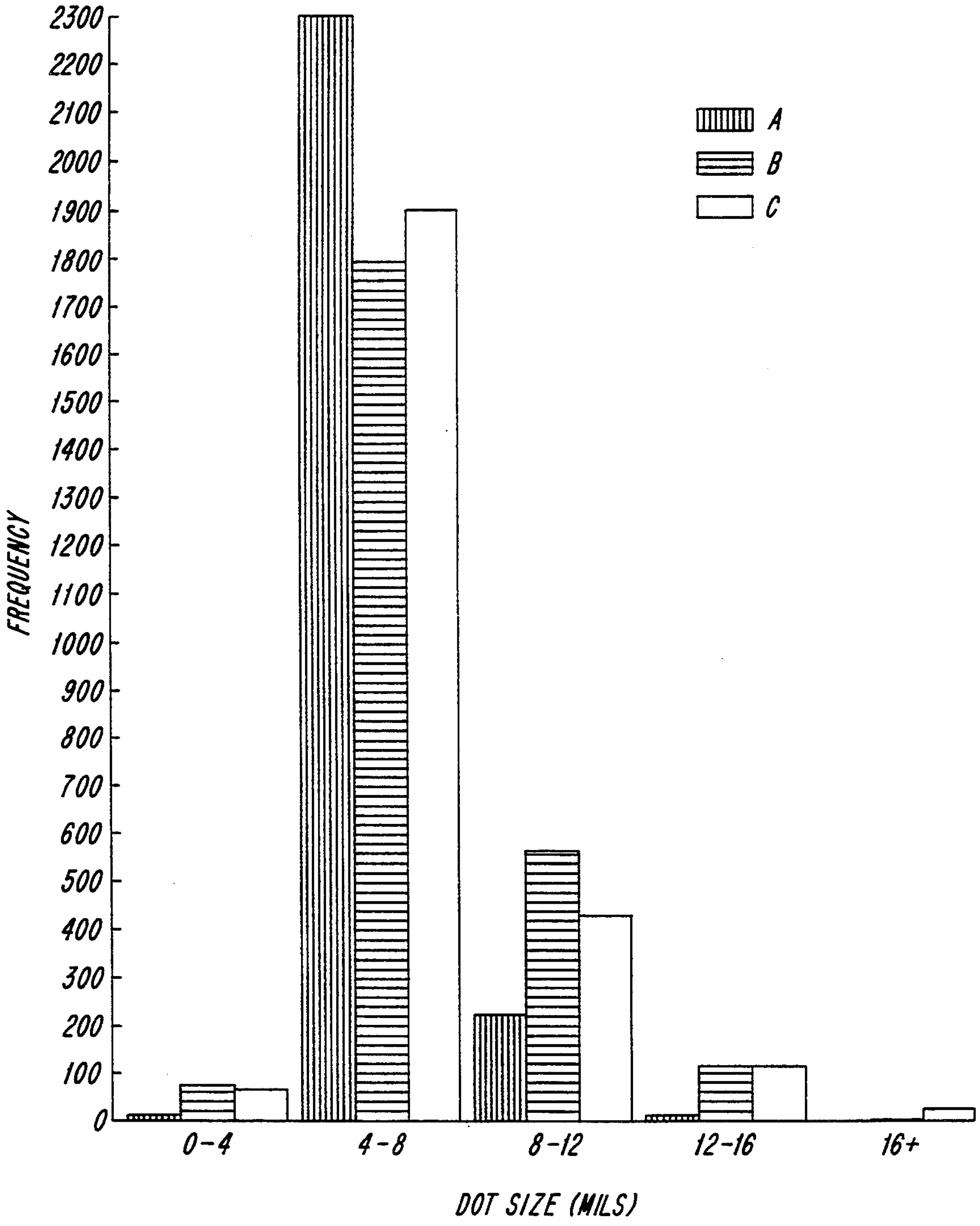
FIG. 3 is a graph of dot size in mils versus frequency obtained on a 400 dot/inch CalComp 68436 plotter for three electrostatic recording media where A is the image resulting from the composite of the present invention, B is the image resulting from a composite material manufactured by Azone Co. and C is the image resulting from an electrostatic recording medium obtained commercially from Arkwright, Inc.

The novel composite material of the present invention comprises a carrier, a conductive layer formed on the carrier, and a dielectric layer containing spacer particles formed on the conductive layer. Optionally, but preferably, the composite material also contains an antistatic back coat.

The Dielectric Layer

The dielectric layer has an abrasion factor less than about 0.3 determined by a brass shim abrasion method and a substantially uniform distribution of spacer particles substantially free of flat spots greater than about 100 microns in the x-y direction and 1500 square microns in area on any part of the surface. The spacer particles are preferably nonabrasive silica, particularly amorphous silica. In the most preferred embodiment, amorphous silica is used in combination with calcium carbonate and clay in the dielectric layer.

In dielectric imaging, there are defects of printing called nib writing which are expressed by a number of large dots appearing in non-imaged areas. Quite surprisingly, it has been found that there is a direct relationship between the nib writing level and the level of abrasion of an electrostatic printing media whether the abrasion level is expressed by the method of U.S. Pat. No. 5,126,763 or the brass shim abrasion method of this invention, described in detail below. Abrasion is understood to mean a process of wear in which there is displacement of material from a surface during relative motion against hard particles or protuberances. It has been found that the lower the abrasion factor, the lower the level of nib writing.

When scanning electron microscopy (SEM) was used to examine the surface of a dielectric layer after plots were obtained from a plotter using a printing media with that dielectric layer (after imaging), brass slivers were found accumulated in the area of nib writing, confirming the destructive influence of abrasion on the image quality.

Thus, in accordance with the present invention, a dielectric layer is provided with an abrasion factor less than about 0.3 determined by a brass shim abrasion method. In a preferred embodiment, the abrasion factor is less than about 0.2. Use of these abrasion levels, along with the other features of the present invention, substantially eliminates poor imaging quality due to nib writing. The abrasion factors of the present invention can be compared with those found using the Arkwright abrasivity tester described in U.S. Pat. No. 5,126,763 at column 6, lines 51-68—column 7, line 7. By that test, the abrasion levels of the present invention are between about 0.004 and about 0.007 inch.

In parallel with SEM, high accuracy profilometry was used to study the surface of dielectric material. The Tencor Corporation, step profiler model P-2 is able to physically scan the surface of the material, providing 2-D and 3-D profiles of the surface with accuracy, measured in $10^{-10}$ meters (or Angströms). When studying surface profiles of various dielectric surfaces, several phenomena were observed which are not mentioned in the art. First, it has been unexpectedly found that the rougher the surface of the imaging media, the lower the nib writing level. Secondly, it has been found that the smoother the surface, the lower the level of image defects, related to missing information line dropouts, etc. Roughness refers to the unevenness of the surface of the imaging media.

Thus, in accordance with the present invention, a dielectric layer is provided which has a roughness greater than about 0.12 microns. Generally, the roughness is between about 0.3 microns and about 1.1 microns.

In a preferred embodiment, the overall average surface roughness of the dielectric layer of the invention is less than about 0.85 microns. More preferably, the overall surface roughness is less than about 0.8 microns. In the most preferred embodiment, the overall surface roughness is less than about 0.7 microns.

At the same time, it has been found that line quality is highly dependent on the nature of the spacers in the dielectric coating. Surprisingly, the 3-D profilograms and SEM pictures revealed that when particles make large aggregates in the x-y direction (higher than 15-20 microns in x-y) and at the same time protrude above 7.5 microns, two phenomena occur.

First, these aggregates are often not surrounded by other spacers, forming low elevation areas, or "flat spots" on the surface, which do not accept charges, or quite possibly are incapable of holding toner after the imaging process is finished, forming a break in the recording. Flat spots are areas substantially free of any projections greater than about 1.2 microns in the z-direction.

Second, small line breaks or dropouts occur, even when such particles are narrow or less than about 15 microns in the x-y direction but protrude up for more than about 9.5 microns.

It has also been found that when the roughness of those flat spots is measured, the spots show very low roughness. When total surface roughness was measured (based on line scanning of this flat spot), it was found that surface smoothness R'a (in those flat spot areas where line break or dropouts were observed) is measured at no more than 0.018-0.25 microns.

Even more surprisingly, it has been found that in many cases, even in the absence of very large particles, flat spots were formed around particulates protruding no more than 2-2.5 microns. Despite the low z-directional elevation, information was lost in these areas due to the flat spots formed around the profusions.

It has now been found, according to the present invention, that when the size of a flat spot is less than 100 microns in the x-y direction, information recording is complete and does not suffer any deterioration. Thus, the dielectric layer of the composite material of the present invention is provided with a distribution of spacer particles substantially free of flat spots greater than 100 microns in the x-y direction and about 1500 square microns in area on any part of the surface. In a preferred embodiment, the spacer particles are substantially free of flat spots greater than about 70 microns in the x-y direction and about 1000 square microns on any part of the surface. The term "substantially free" means that at least the majority of the surface will not have flat spots of the dimensions specified.

According to another embodiment of the invention, the average height of projections about the dielectric surface in the z-direction are less than about 5.2 microns. Preferably, the average height of the projections is less than about 5.0 microns. In a preferred embodiment, the height of the projections is about 4.9 microns.

The spacer particles of the dielectric layer are used to space the outer surface of the dielectric layer from the charging electrodes during the placement of the minute dot-spaced electrostatic charges in latent image form on the recording medium. The spacer particles may be nonabrasive silica, amorphous silica, crystalline silica, calcium carbonates or other particles known for this use. However, it has now been found that when crystalline silica is used alone, or in combination with clay or calcium carbonate, high abrasion results. When crystalline silica is used alone, both high abrasion and a high degree of dropouts and flares are observed. Moreover, crystalline silica may cream health risks for the user. Therefore, the use of crystalline silica is not preferred.

Also, it has been found that when pigments with a high oil absorption value of over about 200 ml/100 g such as Syloid 74 obtained from W. R. Grace are used as the spacer particles, a high degree of particle agglomeration occurs causing many areas of flat spots despite high roughness measured by the Sheffield method. Also, use of these types of pigments causes a high number of unimaged white spots and many artifacts in the image.

Preferably the spacer particles are nonabrasive silica and, most preferably, amorphous silica. The types of amorphous silica which can be used include various types of Sansil grades of amorphous silicas made by PPG Industries or other similar amorphous silicas. The preferred amorphous silica for the present invention is PPG Sansil JR-95 reduced in size by the dry impingement process of the invention. The amorphous silica is generally used in a ratio of about 1:1 to about 1:20 silica in relation to the amount of an insulating binder in the dielectric layer.

Surprisingly, when amorphous silica is selected so that the largest particles are in the range of just above 0 to about 12 microns, a mild abrasion level is achieved which results in good quality of the hard copy. Most of the particles in the distribution are centered around about 1 to 1.5 microns as determined by optical microscope and photography of the distribution analyzed by an Image Analyzer such as the OPTIMAS imaging system, supplied by Image Processing Solutions of Woburn, Mass.

The particle size may also be measured by a Malvern particle size analyzer. Using this instrument, the average particle size of the amorphous silica useful in the present invention is between about 4.3 microns and about 8 microns. When the particle size is measured by Micromeritics Sedigraph 5000 ET, the average particle size is between about 0.6 microns and about 1.5 microns. This test is more sensitive to smaller particles sizes than the Malvern test and is more able to account for the smaller particles in a distribution.

The process for obtaining the distributions of amorphous silica preferred for the present invention involves a particle size reduction and rounding of the particle shape in a dry powder impingement mill, although any process may be used. When material is treated in the mill according to the present invention as described below, it gives stable noncolloidal dispersions by itself and in combination with clays or calcium carbonates. The dispersions form dielectric layers with optimum and controlled properties in such a way that high speed, high quality dielectric layers can be prepared on demand, without sacrificing one property for another.

Although amorphous silica may be used alone in the dielectric layer, when it is used alone, a higher than desired dropout rate may be observed and the surface of the dielectric layer may be rough. Therefore, in a more preferred embodiment, amorphous silica is used in conjunction with another particulate material. The added particulate material is generally of smaller, harder particles than the amorphous silica and is used to improve toner adhesion and optical density. The added particulate material may be calcium carbonate, clay, barium sulfate, talc, starch, magnesium carbonate and the like, or a combination thereof.

One of the particulate materials which can be used in the dielectric layer is clay. In particular, calcined clays of about 0.3 to about 0.8 microns have been found to promote toner adhesion. The clay is preferably used in conjunction with the amorphous silica or other spacer particles since, when used alone as the spacer in a dielectric coating, the clay does not provide adequate toner adhesion.

Calcium carbonate is also useful when used in conjunction with amorphous silica or other spacer particles in the dielectric layer of the invention. Mississippi Lime Calcium Carbonate grade M-60, which is a small size particle, is useful in a dielectric layer composition because it causes only a small abrasive effect. The preferred size of the calcium carbonate particles is between about 0.1 and about 1.5 microns.

In a most preferred embodiment, amorphous silica is used in combination with calcium carbonate and calcined clay for the dielectric layer of the invention. These components of the dielectric layer are generally used in amounts of about 50 to about 90% binder, about 5 to about 50% amorphous silica, about 2 to about 10& calcium carbonate and about 2 to about 10% clay. Preferably, the amorphous silica, calcium carbonate and clay are used in a ratio of about 1:0.5:0.5.

The spacer particles and other particulate materials are generally used in a formulation with a binder. This binder will generally be a polymeric compound and can be any binder known to be useful for dielectric layers. Preferably, the binder is a mixture of polyvinyl butyral and styrene-maleic anhydride copolymer.

In another most preferred embodiment, the dielectric layer is prepared by subjecting the spacer particles and other particulate materials, if used, to a dry impingement mill, followed by dispersion of the resulting material in a dispersion medium. Descriptions of an impingement mill and its operation may be found, for example, in U.S. Pat. Nos. 4,533,254 and 4,783,502 and are commercially available, e.g., Model M110T or M110Y, manufactured by Microfluidics, Inc. The dry impingement mill preferably is an 8" micronizer made by Sturtevant, Inc. of Boston, Mass. The flow rates through the mill generally are from about 50 to about 125 lbs/hr. The preferred flow rates are about 75 to about 125 lbs/hr.

The process of dispersion involves first adding from about 5 to 30% of the binder to be used in the dielectric layer to the dispersion medium, followed by addition of the silica, while allowing it to disperse. In a preferred embodiment, about 15 to about 25% of the binder is added first. If clay or calcium carbonate is also to be added, they can be added in turn to also be allowed to disperse in the dispersing medium. The dispersion medium may be aqueous or nonaqueous and generally is polyurethane, styrene-acrylonitrile copolymers, polyvinyl butyral or styrene-maleic anhydride copolymers or the compatible combinations thereof along with any solvents necessary. If the binder is not in a solution, it will be solubilized by the dispersion medium. Once the various components have been added, the remaining portion of the binder can then be added to the dispersing medium, after which the dispersion is complete.

It has been found that first adding a small portion of the binder, followed by addition of the solid materials to be dispersed, and subsequent addition of the remaining amount of binder to the dispersion medium to either dissolve or solubilize the binder results in a very stable dispersion even for noncolloidal particles. It is desired that this occurs without any classification or separation of the particles after the impingement since the use of only the large particles results in agglomeration when dispersion is attempted, and use of only the small particles results in a dispersion/dielectric layer which is not useful since the particles are too small to qualify as spacer particles. It has also been observed that agglomeration occurs if one first wets the solid materials with the dispersing medium and then adds all of the binder. If all of the binder is added first, the solution obtained is of such high viscosity that one cannot disperse the solid components, such as the silica spacer particles, without agglomeration.

The process of the present invention, however, has been found to provide an excellent dielectric layer, particularly when amorphous silica spacer particles are employed in combination with calcium carbonate and clay.

The Conductive Layer/Ground Plane

The dielectric layer of the invention is to be deposited on a conductive layer, preferably on a humidity insensitive ground plane. The deposition or coating of the dielectric layer onto the conductive layer may be performed by any conventional method for such coatings such as rod coating or reverse roll coating and the like. The conductive layer of the ground plane can be any of a number of conductive layers known in the art which contain electronically conductive particulates. Preferred conductive layers include those composed of inorganic electronically conductive particulates dispersed in an electrically insulating polymeric binder having one or more nitrogen-containing functional groups. The inorganic electronically conductive particulate can be any of the semiconductors known in the art, including doped metal oxides such as doped tin oxide, indium oxide, indium tin oxide and doped zinc oxide and metal containing semiconductors such as the metal halides CuI and AgI. In general, such conductive layers can be prepared and coated onto a carrier using conventional technology.

In a preferred embodiment, the conductive layer of the conductive ground plane is comprised of low doped grades of tin oxide, indium oxide and indium tin oxide, which can essentially provide colorless conductive layers, which, when applied to a white substrate, would provide a white conductive ground plane.

The amount of dopant employed is of a very small amount ranging from about 0.4 to about 3.0 weight percent. It is preferred that the amount of dopant used is less than 1 weight percent, more preferably less than 0.5 weight percent, but at least 0.4 weight percent. The amount of dopant generally affects the color by adding a gray or yellow tint. When conventional amounts of dopant are employed, e.g., from 6 to 10 weight percent, the whiteness range (L value) is anywhere from about 58 to about 80 when measured in accordance with CIE LAB, Hunter or X-Rite measuring systems and devices. When about 3 weight percent of the dopant is used, the whiteness of the resulting conductive layer is about 91, and it is about 95 when 0.4 weight percent of dopant is used. Any whiteness less than about 88 has a perceivable gray or yellow tint. The existence of such a perceptible color becomes especially important when used with a white paper carrier or white film carrier.

The problem which generally has existed with using such low amounts of dopant, however, is the lack of conductivity achieved versus that needed to make the conductive layer useful. However, through the use of a preferred process of the present invention, one is able to achieve a conductivity which ranges anywhere from 1 to 10 Mohm/sq, and in particular from 1 to 3 or 4 Mohm/sq. It is believed by applicants that such surprising conductivity is achieved through the process of the present invention, i.e., the dry impingement/wet impingement process, in that the particles are not ground, but reduced to their smallest size without breaking them, thereby retaining the conductive properties and enhancing the contacts between the particles. In this sense, the particles provide excellent packing and they are less insulated within the coating, i.e., closer together with less binder in between, and therefore exhibit the much unexpected conductivity. The conductive particles obtained by the process of the present invention are generally in the size range of about 100 to about 350 nm. In a preferred embodiment, the particles are about 100 to about 200 nm.

The process of the present invention for preparing a stable colloidal dispersion of particles useful for the conductive ground plane involves first subjecting electronically conductive particles to a dry powder impingement mill, and then dispersing the resulting solid particulates in a dispersing medium. The dispersing involves first solubilizing or dissolving from 5 to 30%, more preferably about 15 to about 25%, of a total amount of binder in the dispersing medium. This dispersion of conductive particles is then subjected to a further particle reduction in a Microfluidizer®, or wet impingement mill, to obtain the desired particle size. A wet impingement mill is an impingement mill utilized with fluid. The remainder of the binder is then added to the dispersing medium. The dispersion resulting from the microfluidizer is optionally, but preferably, further subjected to classification and separation of different particle sizes.

The electrically conductive layer of the present invention is also humidity independent. By humidity independent it is meant that the resistivity of the ground plane does not change from the initial value more than 15% when exposed to 20, 50 and 75% relative humidity (R.H.) at 50° F. over a 24 hour period. When used with a dielectric medium and imaged electrographically, the humidity independence is observed in that the optical density of an image changes less than 15% when the material is used for imaging at 20, 50 and 75% relative humidity at 50° F.

The humidity independence is an important property which permits the use of the conductive ground plane of the present invention in many different applications. Such applications include as an antistat. Another application would be as an electromagnetic shield or electrostatic dissipation material. Other possibilities would be as an antistat material on carpet fibers.

The electrically insulating polymeric binder used in the conductive layer can be any of a number of compounds known for use in conductive layers. However, the binder will preferably have a nitrogen-containing group, such as amide, nitrilo or nitro. In a preferred embodiment, the polymeric binder is a water-soluble polymer which is not cross-linked. These polymers include polyurethanes, polyacrylates, polyvinyl pyrrolidone, of combinations thereof. The most preferred in this group is polyurethanes. In another preferred embodiment, the polymeric binder is solvent-soluble nitrocellulose, styrene-acrylonitrile copolymers, polyacrylamides, or combinations thereof.

The reason the foregoing binders are preferred is that at the same coating rate and binder amount, the absorbance of the binder on the conductive particles is such as to not hinder the contact between the particulates, and thereby results in a higher relative conductivity. This allows the use of relatively less conductive particulates at a higher particulate to binder ratio with selected binders without the loss of transparency. For use in a dielectric composite, a particulate to binder ratio of from about 4:1 to about 18:1 will generally be employed. Preferably, the particulate to binder ratio is from about 5:1 to about 18:1.

Another feature of the present invention is the ability to make colored conductive ground planes. According to the present invention, a conductive ground plane is provided which exhibits color which has a carrier and an electrically conductive coating, which coating contains electronically conductive particulates and an acid developable dye which has chemically reacted with the electronically conductive particulates. The ability of the invention to provide such a ground plane is based upon the discovery that acid developable dyes react with the electronically conductive particulates to form stable colors on the surface of the ground plane without an application of heat or pressure such as usually required to develop those dyes.

These ground planes are preferably made with a plastic film carrier and have transparent, humidity insensitive coatings. The surface resistivities of the ground planes depend upon the use and may be about $10^9$ to $10^{11}$ ohms/square for antistatic ground planes, $10^5$ to $10^9$ ohms/square for dissipative static layers and about $10^1$ to about $10^5$ ohms/square for conductive layers.

Generally, any dye developable by an acid can be employed in creating the colored ground plane. The dye is simply added to the dispersion prior to coating onto the carrier layer.

Preferred dyes include those such as aminofluoranes, phthalides and indolinofurans which are leuco dyes. Suprisingly, these dyes do not require a phenolic developer used with heat or pressure in order to obtain stable and vibrant colors. The use of dyes to prepare colored ground planes permits one to produce conductive surfaces of required colors. Such conductive colored surfaces may be useful in preparing security imaging data, distinguishable electronics, antistat protective packaging, electrostatic dissipation applications, automotive primer paints, primers for conductive carpets, etc. It also permits one to use dark colored, high conductivity semiconductive powders, changing their color on the ground plane without affecting their semiconductive properties.

The application of a colored ground plane can be made with any ground plane employing electronically conductive particulates as conductivizing agents. The conductive ground plane can be made in accordance with the dry impingement/wet impingement process of the claimed invention, or any conventional process. The colored conductive ground plane shows humidity independence as do all the ground planes of the present invention.

Another unique advantage of the present invention, and in particular the ground plane of the present invention, is that when the dry impingement/wet impingement process is employed to prepare the conductive layer, the nanometer scale of the particles also gives one the capability to achieve a bulk conductivizing of the porous carriers, such as paper, without a need to apply the conductive material on both sides of the carrier. Thus, by applying a conductive layer to simply one part of a porous carrier such as paper, sufficient surface resistivity would be registered on both sides of the paper for dielectric imaging. Therefore, one need only coat the dielectric layer on the uncoated side. This is believed to occur because of conductive clustering formed within the paper itself. The conductive clustering is possible due to the colloidal nanometer size of the particles employed in the dispersion coated onto the paper.

The Carder Layer

The conductive layer is formed on a carrier layer, by conventional coating techniques for the materials used. The carrier layer may be a plastic film, paper, synthetic paper, conductivized paper, vellum or fabric. Preferred plastic films include white polyester, polyvinyl chloride or polyolefin film. A preferred synthetic paper is one formed by casting polyethylene film on both sides of a polypropylene or paper substrate material. The preferred preconductivized paper has ionic conductivity. In the preferred embodiment, the carrier layer is paper or plastic film.

When a plastic film is used as the carrier layer, it is useful to include a further layer as part of the composite material. This layer is an antistatic layer formed on the carrier on the opposite side from the conductive layer. This layer is preferably humidity independent. The antistatic layer comprises an inorganic semiconductor in an insulating binder. The inorganic semiconductor may be any of the above listed electronically conductive particulates and, in the preferred embodiment, is antimony doped tin oxide. The insulating binder of the antistatic layer may be styrene-acrylonitrile copolymers, polyacrylates, polyurethanes or cellulose derivatives. In a preferred embodiment, the insulating binder is styrene-acrylonitrile copolymer.

The electronically conductive particulates and insulating binder of the antistatic layer are generally used in a ratio of from about 1:1 to about 5:1. In the preferred embodiment, the ratio is about 3:1.

Other layers may also be provided as part of the composite of the invention, such as a matte layer without antistatic properties.

FIG. 1 of the Drawings shows the image obtained by a film composite obtained from Arkwright, Inc., which from the characteristics measured is believed to be manufactured according to U.S. Pat. No. 5,126,763. FIG. 2 shows the image obtained by a composite according to the present invention comprising a polyester carrier, a dielectric layer containing amorphous silica, calcium carbonate and clay, a conductive ground plane containing doped tin oxide in a styrene-acrylonitrile copolymer with a small amount of nitrocellulose binder, and an antistatic layer of doped tin oxide and styrene-acrylonitrile copolymer with a trace amount of nitrocellulose binder. As shown, the present invention provides a clear, dense image without the artifacts and nib writing of the '763 image.

In another embodiment of the present invention, there is provided a composite material having a carrier, a conductive layer, and a dielectric layer which provides an image with more than 90% of the dots of a size between about 100 and about 200 microns when the composite is used with a 400 dot/inch plotter. This embodiment is illustrated by FIG. 3. The dots referred to in FIG. 3 are obtained by measuring the dots in a quadrant consisting of 51 rows with 50 dots in a row as in a part of a test plot from CalComp 68436 plotter. It has been found that the dot size obtained by a recording medium is strongly related to the number and types of defects in the resulting hard copy. When the dot size is controlled to be more than 90% between about 100 microns and about 200 microns, it has been found that very few defects will occur in the hard copy. Conversely, when the dot size is greater than 300 microns, defects such as artifacts and dropouts are common. As shown in FIG. 3, the dot size of over 90% of the dots of the present invention is maintained between about 100 and 200 microns, while the dot size obtained by the composite obtained from Arkwright, Inc., is only about 75% between 100 and 200 microns. Further, the present invention does not result in any dot sizes above about 400 microns and results in very few dots greater than 300 microns. Thus, the present invention provides a clear, dense image.

The invention will be illustrated in greater detail by the following specific examples. It is understood that these examples are given by way of illustration and are not meant to limit the disclosure or the claims to follow. All percentages in the examples, and elsewhere in the specification, are by weight unless otherwise specified.

EXAMPLES

Brass shim abrasion method.

This method was developed and first disclosed by present inventor B. J. Katsen at the Bis CaP International Conference on Non-Impact Printing Materials in Monterey, Calif. in 1989.

The method utilizes brass shim as the model material to study abrasion of coated materials in the printing nib of printers, plotters and recorders.

For this test method, the Adams West Rub Tester is used. Material (film, paper or fabric) is mounted on the rubber wheel of the tester with double sticky tape. The length of the sample is about 11.2–11.6 cm and there is no overlap at the joint of the sample ends. A brass shim square is mounted on the immobilized bronze wheel also with double sticky tape. A bronze wheel is located in the pivoting arm of the tester, which is descended on the surface of the sample. An electrical motor of the tester provides a revolving motion to the rubber wheel, 1000 revolutions are automatically counted, the pivoting arm is lifted and the brass shim removed. On the surface of the shim the narrow band of abraded brass material is observed. The light reflection value is taken from the inside of the abraded area and the reflection is read at least 15–30 times in a Macbeth print contrast meter, model PCM-II. An averaged reflection value is repeated three times for each sample (using a new strip of material at each repetition) and is reported as an abrasion factor—Fa. The background reflection of unabraded brass shim is 0.05. If reflection from the abraded area is higher, then the abrasive action of the material is higher. In the course of studying the abrasion process, it was found that the dust and slivers of the abraded brass shim were transferred onto the surface of the abrasive sample. A small concentration of brass was observed when Fa was in the range 0.05 to 0.23; a low to moderate level of transfer was found in the range of 0.23 to 0.32, and a heavy level was observed from 0.32 to 0.5, after which the material shows an extremely heavy level of abrasion.

EXAMPLE 1

Preparation of Dielectric Top Coat

Amorphous silica (PPG grade of Sansil) of average particle size 17 microns (by Malvern 3600 particle size analyzer) was treated in a Sturtevant 8" micronizer at a flow rate of 75; 100; 115; and 125 lbs/hr. The dispersion process was conducted as follows: To a Kady—Dissolver, 550 lbs of toluene and 240 lbs of Dowanol PM were charged.

66 lbs of polyvinyl butyral (Monsanto Butvar grade B-79) were added and left under agitation until a complete solution of PVB was achieved. To this solution, in different batches, 13.4 lbs amorphous silica, processed in a Sturtevant micronizer, was added and agitated for 30 minutes, to provide a complete wetting of silica and to achieve dispersion stabilization.

6.7 lbs of $CaCO_3$ (grade M-60 Mississippi Lime Co.) were added, followed by 6.7 lbs of Translink 77 calcined clay (from Engelhard). The mixture was agitated for 30 minutes, after which another 66 lbs of Butvar B-79 were added and dissolved under agitation. In the end, 56.2 lbs of Monsanto styrene-maleic anhydride resin known as Scripset 540 was added, the mixture was allowed to agitate and, after analysis for particle size and viscosity, was transferred to the feeding tank of a reverse roll coater.

The dispersion obtained consists of

| | | |
|---|---|---|
| Toluene - 550 lbs | or | 55% |
| Dowanol PM (an alcohol) - 255 lbs | or | 23.5% |
| Butvar B-79 (polyvinyl butyral) - 13.2 lbs | or | 13.2% |
| Scripset 540 (styrene-maleic anhydride copolymer) - 56.2 lbs | or | 5.6% |
| Silica, Amorphous - 13.4 lbs | or | 1.3% |
| Clay Translink 77 - 6.7 lbs | or | 0.7% |
| $CaCO_2$M-60 6.7 lbs | or | 0.7% |

Preparation of the Conductive Layer

Tin oxide, grade CP-30E (Keeling and Walker, Ltd., Stock on Trent, United Kingdom) was dispersed in a one percent solution of nitrocellulose (grade SS30, Hercules Inc.) in a Silverson dispersion device at about 7000 RPM's until the average particle size was 0.9–1.3 microns. A Silverson dispersion device is a vessel containing an agitator having a stator and a rotor through which assembly the dispersion of the dry powder in the dispersing media occurs. The material was transferred to a Microfluidizer® and processed in one pass at 10,000 psi pressure, obtaining a particle size (by Malvern) of about 300 nm. The dispersion was let down by 25% solution of styrene-acrylonitrile copolymer (Lustran) to obtain the following dispersion:

| | |
|---|---|
| Antimony doped tin oxide (2.5% antimony) | 37% |

-continued

| | |
|---|---|
| Methyl ethyl ketone | 41% |
| Methyl propyl ketone | 10% |
| Nitrocellulose | 0.6% |
| Lustran | 1.4% |
| Diacetone alcohol | 2% |

The dispersion was transferred to the holding tank of the reverse gravure coating station.

Preparation of Antistatic Layer

Antimony doped tin oxide (0.4% of antimony) was processed at the flow rate of 8 lbs/hr in dry process micronizer (Sturtevant, 8" micronizer). The particle size was reduced from 3 microns to about 0.5 microns. The wet part of processing was done in the same manner as in the procedure of preparing the conductive layer. The final dispersion of the antistatic layer is shown in Table I.

TABLE I

| Dispersion | |
|---|---|
| Antimony doped tin oxide grade CP-40W | 37% |
| Methyl ethyl ketone | 41% |
| Methyl propyl ketone | 10% |
| Nitrocellulose | 0.7% |
| Lustran | 3.0% |

Polyester, with a matting layer on the back side was overcoated on the matte side with the antistatic layer to obtain surface resistivity of about $10^9$–$10^{10}$ ohms/sq. The conductive layer was then coated on the coating machine to deposit 0.3–0.45 lbs of antimony doped tin oxide per 1000 square feet.

The resulting conductive coating had a resistivity of approximately 2 Mohm/sq. and was dried in the dryer after which it was overcoated separately with a dielectric image accepting layer based on amorphous silica processed through a Sturtevant micronizer at 75, 100, 115 and 125 lbs/hr, correspondingly. The application rate of the dielectric coating was 0.6 to 0.9 lbs/1000 sq feet. The material was striped with the conductive edge stripe and imaged on a Versatec Plotter 8536 and CalComp color plotter 68436. Surface roughness, abrasive characteristics, the number of artifacts, missing dots, line quality and dot size and distribution of dots by sizes (using OPTIMAS image analyzer) were determined and compared (see Table II).

The abrasion factor determined by the brass shim abrasion method was in the range of 0.16 to 0.25 for each composite. The image density of the hard copy obtained from the composites of this example was greater than 1.35 O.D.U. on the CalComp plotter and about 1.4–1.5 O.D.U. on the Versatec plotter.

TABLE II

Physical and Imaging Characteristics of the Composites

| Composite | Amorphous silica, processing rate through dry micronizer | Resistance conductive layer RS. Mohms/sq | Average surface roughness micron | Sheffield smoothness |
|---|---|---|---|---|
| Composite I | 75 | 2.3 | 0.4000 | 35 |
| Composite II | 100 | 2.4 | 0.6300 | 50 |
| Composite III | 115 | 2.4 | 0.7500 | 60 |

TABLE II-continued

Physical and Imaging Characteristics of the Composites

| Composite | Amorphous silica, processing rate through dry micronizer | Resistance conductive layer RS. Mohms/sq | Average surface roughness micron | Sheffield smoothness |
|---|---|---|---|---|
| Composite IV | 125 | 2.2 | 0.8000 | 70 |

EXAMPLE 2

Antimony doped tin oxide of grade CP40W (Keeling and Walker, Ltd.), with an antimony content of about 0.4 wt. %, average particle size as determined by Malvern 3600 particle size analyzer about 4 microns, was processed at a flow rate of about 8 lbs./hr. through a dry powder micronizer, made by Sturtevant, Inc. in which particles are impinged in the micronizer chamber. The flow in the chamber makes a vortex into which only the small particles could be included, larger particles have to stay in the periphery of the mill chamber until the aggregates are weakened and dissociate to a smaller size.

The average particle size after the dry powder mill is reduced to about 0.5–0.9 microns. Thus, obtained particles were mixed into a 1% solution of nitrocellulose to make a 45.6% dispersion in the Silverson mixer and subsequently processed through the microfluidizer at 15,000 psi's to give a nanoscale dispersion of about 220 nanometers. The solvent which makes the balance in the dispersion comprised 43.5% of methyl ethyl ketone and 10% of methyl propyl ketone. The dispersion was adjusted with 25% solution of Lustran to 37% solids and was coated at 0.4 lbs./1000 sq. feet to give a surface resistivity of 1.3–1.5 Mohm/sq. The coating was practically transparent when coated on clear polyester.

The dispersion of Example 2 was then coated on a white polyester carrier to give a conductive ground plane, having a surface resistivity of about 1.5 Mohm/sq. and the following hue of white, as measured by X-Rite Color densitometer.

L- 95.79

This is an extremely white ground plane, suitable to be used for presentation graphics, high quality display and advertisement material.

COMPARATIVE EXAMPLE 1

The entire process of Example 2 was repeated without the application of a dry powder impingement mill. The average particle size after the microfluidizer was about 380 nm. The material was opaque when coated on the clear polyester film.

The material was let down to 37% solids and coated on a white polyester film to give a conductive ground plane having a surface resistivity of 70 Mohm/sq., missing the resistivity required for successful electrostatic imaging.

EXAMPLE 3

1080 g of copper iodide initial particle size of about 4–6 microns (Sheppard Chemical Co.) were processed in a dry powder form in a 4 inch laboratory micronizer. Particle size after processing was less than 0.9 microns, measured by a Malvern 3600 particle size analyzer. 845 g of the thus processed material were transferred in a 1000 g 0.2% solution of polyvinyl alcohol and dispersed in Silverson dispersion at 7500 RPM's.

The resulting dispersion was processed in a laboratory Microfluidizer ® to give a dispersion of CuI particles, showing surface resistivity of $2\times10^{-6}$ ohms/sq. at coating weight of 0.15 lbs./1000 sq. ft.

EXAMPLE 4

200 g of the final dispersion of Example 2 was mixed with 0.1 gram of 3.3-BIS(1-butyl-2 methyl-1H-indol-3-yl)-1(3H)-isobenzofuranone. The dispersion was colored immediately in magenta colors.

COMPARATIVE EXAMPLE 2

A comparative conductive layer is prepared to have:

| | |
|---|---|
| Antimony doped tin oxide (antimony content - 5.6%) | 37% |
| Nitrocellulose | 0.7% |
| Lustran | 5.5% |
| Methyl ethyl ketone | 44% |
| Methyl propyl ketone | 10.8% |
| Diacetone alcohol | 2.00. |

The conductive layer was coated on white polyester to give a conductive ground plane which was dark and gave an L value of below 75.

EXAMPLE 5

The following example compares the surface resistivity achieved at particular particulate to binder ratios when employing different binders. The particulate in each case is antimony-tin oxide (average particle size about 120 nm) and the binder is identified with each respective table.

| | Polyurethane Binder | |
|---|---|---|
| PARTICULATE TO BINDER RATIO | COATING WEIGHT (lbs./1000 sq. ft.) | SURFACE RESISTIVITY (ohms/sq.) |
| 3:1 | 0.25 | $2 \times 10^9$ |
| | 0.35 | $2 \times 10^8$ |
| | 0.45 | $2.0 \times 10^8$ |
| 5:1 | 0.25 | $2.0 \times 10^8$ |
| | 0.35 | $2 \times 10^7$ |
| | 0.45 | $8 \times 10^6$ |
| 7:1 | 0.25 | $4.5 \times 10^7$ |
| | 0.35 | $1.5 \times 10^7$ |
| | 0.45 | $6 \times 10^7$ |
| 9:1 | 0.25 | $3 \times 10^7$ |
| | 0.35 | $1.5 \times 10^7$ |
| | 0.45 | $5 \times 10^7$ |

| | Nitrocellulose Binder | |
|---|---|---|
| PARTICULATE TO BINDER RATIO | COATING WEIGHT (lbs./1000 sq. ft.) | SURFACE RESISTIVITY (ohms/sq.) |
| 3:1 | 0.25 | $5 \times 10^8$ |
| | 0.35 | $5 \times 10^7$ |
| | 0.45 | $8 \times 10^6$ |
| 5:1 | 0.25 | $3 \times 5 \times 10^7$ |
| | 0.35 | $8 \times 10^6$ |
| | 0.45 | $4 \times 10^6$ |
| 7:1 | 0.25 | $2 \times 5 \times 10^7$ |
| | 0.35 | $6 \times 10^6$ |
| | 0.45 | $2 \times 10^6$ |
| 9:1 | 0.25 | $2 \times 10^7$ |
| | 0.35 | $2 \times 10^6$ |
| | 0.45 | $2 \times 10^6$ |

-continued

| | Polyester Resin | |
|---|---|---|
| PARTICULATE TO BINDER RATIO | COATING WEIGHT (lbs./1000 sq. ft.) | SURFACE RESISTIVITY (ohms/sq.) |
| 3:1 | 0.25 | $5 \times 10^8$ |
| | 0.35 | $3 \times 10^8$ |
| | 0.45 | $1.5 \times 10^8$ |
| 5:1 | 0.25 | $6 \times 10^8$ |
| | 0.35 | $3 \times 10^7$ |
| | 0.45 | $1.5 \times 10^7$ |
| 7:1 | 0.25 | $1.5 \times 10^7$ |
| | 0.35 | $1.0 \times 10^7$ |
| | 0.45 | $1 \times 10^7$ |
| 9:1 | 0.25 | $1.5 \times 10^7$ |
| | 0.35 | $1 \times 10^7$ |
| | 0.45 | $5 \times 10^7$ |

| | Ethylcellulose Binder | |
|---|---|---|
| PARTICULATE TO BINDER RATIO | COATING WEIGHT (lbs./1000 sq. ft.) | SURFACE RESISTIVITY (ohms/sq.) |
| 3:1 | 0.25 | $1.5 \times 10^{11}$ |
| | 0.35 | $1.0 \times 10^{11}$ |
| | 0.45 | $1 \times 10^{11}$ |
| 5:1 | 0.25 | $0.5 \times 10^{11}$ ($5 \times 10^{10}$) |
| | 0.35 | $8 \times 10^9$ |
| | 0.45 | $2 \times 10^8$ |
| 7:1 | 0.25 | $2 \times 10^8$ |
| | 0.35 | $8 \times 10^7$ |
| | 0.45 | $6 \times 10^7$ |
| 9:1 | 0.25 | $1 \times 10^7$ |
| | 0.35 | $0.8 \times 10^7$ |
| | 0.45 | $6 \times 10^6$ |

EXAMPLE 6

Beginning with an antinomy doped tin oxide powder having an initial particle size of between 4 and 6 microns, the powder was subjected to comminution in a dry impingement device, reducing the particle size to the range of 0.9–1.2 microns. The resulting powder was then dispersed with an acrylonitrile-styrene copolymer in a Silverson dispersion device, which reduced the particle size to about 0.9 microns. The Microfluidizer ® was then employed on the resulting dispersion to achieve a reduction of particle size to less than or equal to 0.25 microns. Classification of the resulting dispersion obtained from the microfluidizer only took those particular particles in the binder solution having a size of less than or equal to 0.15 microns.

The resulting dispersion was then coated onto a polyester film at a pigment to binder ratio of 1.6 to 1. The resulting ground plane was clear, transparent, scratch-resistant, durable, humidity insensitive, and useful as an antistatic film. The antistatic film had a resistivity of about $10^{10}$–$10^{11}$ ohms/sq.

EXAMPLE 7

The copper iodide composition of Example 3 was prepared by subjecting copper iodide powder to an impingement device. The resulting powder was then dispersed in polyvinyl alcohol in a Silverson dispersion device. The resulting dispersion was then passed through a Microfluidizer® with the resulting dispersion being separated to remove only those particles of the dispersion having a size of less than or equal to 120 nanometers. The dispersion was then coated onto a polyester film, which provided a transparent conductive ground plane. Two coatings were made—one at 0.15 lbs./1000 sq. ft. and the other at 0.3 lbs./1000 sq. ft. The surface resistivities were $10^6$ ohms/sq. and $10^5$ ohms/sq. respectively. When exposed to air, the surface resistivity has been found to be $10^4$ ohms/sq. Such a conductive ground plane would be useful for electrostatic dissipation in an electromagnetic shield protective device.

EXAMPLE 8

Composite III of Example 1 of this invention was used to abrade the printheads, used in CalComp 57000 series and Versatec 8536 Plotters. A strip of film, representing the composite of Example 1 was put on the rubber wheel of an Adams wet rub tester and a small sample of CalComp 57000 series print head and, in a separate test, a specimen of Versatec 8536 print head, were held by hand against the surface of the dielectric layer at a 90° angle to the surface of the film. After 1000 revolutions of the film against the print head, the profilogram of the surface of the print heads after abrasion was taken and compared with the surface profile of the unabraded print head.

TABLE III

| | Print head abrasion | | | |
|---|---|---|---|---|
| | | Total peak to valley distance on the surface of print head (microns) | | |
| Print head Origin | Abrading Film Origin | Before Abrasion | After Abrasion | Abrasion in Microns |
| CalComp 57000, 200 DPI'a | Film of this invention | 1.746 | 1.746 | 0.00 |
| | Film obtained from Arkwright | 1.808 | 1.075 | 0.72 |
| Versatec 8536 200 DPI | Film of this invention | 3.281 | 3.226 | 0.06 |
| | Film obtained from Arkwright | 3.281 | 2.154 | 1.13 |

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A composite material useful in electrostatic imaging technology comprising:

a carrier;

a conductive layer formed on the carrier; and a dielectric layer containing spacer particles formed on the conductive layer and having an abrasion factor less than about 0.3 determined by brass shim abrasion method, a roughness greater than about 0.12 microns, and a substantially uniform distribution of spacer particles substantially free of flat spots greater than about 100 microns in the x-y direction and about 1500 square microns in area on any part of the surface.

2. The composite material of claim 1 wherein the spacer particles are nonabrasive silica.

3. The composite material of claim 2 wherein the spacer particles are amorphous silica.

4. The composite material of claim 3 wherein the dielectric layer further contains calcium carbonate, clay or a combination thereof.

5. The composite material of claim 4 wherein the dielectric layer further contains a binder.

6. The composite material of claim 5 wherein the dielectric layer contains about 50 to about 90% binder, about 5 to about 50% amorphous silica, about 2 to 10% calcium carbonate and about 2 to about 10% clay.

7. The composite material of claim 1 wherein the conductive layer is a conductive ground plane.

8. The composite material of claim 7 wherein the conductive ground plane has a surface resistivity of 1 to 10 Mohms/square.

9. The composite material of claim 1 wherein the carrier is a plastic film, paper, synthetic paper, conductivized paper, vellum or fabric.

10. The composite material of claim 9 wherein the carrier is paper.

11. The composite material of claim 9 wherein the carrier is preconductivized paper having ionic conductivity.

12. The composite material of claim 9 wherein the carrier is white polyester, polyvinyl chloride or polyolefin film.

13. The composite material of claim 9 wherein the carrier is synthetic paper formed by casting polyethylene film on both sides of a polypropylene or paper substrate material.

14. The composite material of claim 1 further comprising an antistatic layer formed on the carrier on the opposite side from the conductive layer.

15. The composite material of claim 14, wherein the antistatic layer comprises an inorganic semiconductor in an insulating binder.

16. The composite material of claim 15 wherein the antistatic layer is humidity independent.

17. The composite material of claim 16 wherein the insulating binder contains one or more nonconductive insulating filler materials.

18. The composite material of claim 1 wherein the conductive layer comprises an electronically conductive particulate dispersed in an electrically insulating polymeric binder having one or more nitrogen-containing functional groups.

19. The composite material of claim 18 wherein the electrically insulating polymeric binder is nitrocellulose, a styrene-acrylonitrile copolymer, polyurethane, polyacrylamide or combinations thereof.

20. The composite material of claim 18 wherein the electrically insulating polymeric binder is a water soluble polymer which is not cross-linked.

21. The composite material of claim 20 wherein the water soluble polymer is polyurethane, polyacrylate or combinations thereof.

22. The composite material of claim 18 wherein the particulate to binder ratio is about 5:1 to about 18:1 by weight.

23. The composite material of claim 7 wherein the conductive ground plane has a substantially white reflection and appearance with an L value as high as 95.

24. The composite material of claim 18 wherein the electronically conductive particulate is antimony doped tin oxide or CuI in an aqueous polymer.

25. The composite material of claim 24 wherein the antimony is present in an amount of about 0.4%.

26. The composite material of claim 18 wherein the electronically conductive particulate has an average particle size of about 100 to about 350 nanometers.

27. The composite material of claim 3 wherein the amorphous silica contains particles with an average particle size as determined by a Malvern particle size analyzer of from about 4.3 to about 8 microns in diameter.

28. The composite material of claim 1 wherein the dielectric layer has a topographical surface roughness less than about 0.85 microns and the abrasion factor is less than about 0.2.

29. The composite material of claim 28 wherein the dielectric layer has an overall topographical surface roughness less than about 0.7 microns.

30. The composite material of claim 1 wherein the uniform distribution of spacer particles is substantially free of flat spots greater than about 70 microns in the x-y direction and 1000 square microns in area on any part of the surface.

31. The composite material of claim 24 wherein the electronically conductive particulate is CuI and the surface resistivity is about $10^5$ ohms/sq.

32. The composite material of claim 31 wherein the surface resistivity degrades to $10^4$ ohms/sq. upon exposure to air.

33. A composite material comprising a carrier, a conductive layer formed on the carrier and a dielectric layer containing spacer particles formed on the conductive layer which provides an image with more than 90% of the dots of a size between about 100 and about 200 microns when the composite is used with a 400 dot/inch plotter and has a roughness greater than about 0.12 microns.

34. The composite material of claim 33 wherein the spacer particles are amorphous silica.

35. The composite material of claim 34 wherein the dielectric layer further contains calcium carbonate, clay or a combination thereof.

36. The composite material of claim 35 wherein the dielectric layer further contains a binder.

37. The composite material of claim 36 wherein the dielectric layer contains about 50 to about 90% binder, about 5 to about 50% amorphous silica, about 2 to about 10% calcium carbonate and about 2 to about 10% clay.

38. The composite material of claim 33 wherein the conductive layer is a conductive ground plane.

39. The composite material of claim 33 wherein the carrier is a plastic film, paper, synthetic paper, conductivized paper, vellum or fabric.

40. The composite material of claim 33, further comprising an antistatic, humidity independent layer comprising an inorganic semiconductor in an insulating binder formed on the carrier on the opposite side from the conductive layer.

41. The composite material of claim 40 wherein the carrier is a plastic film.

42. The composite material of claim 33 wherein the conductive layer comprises an electronically conductive particulate dispersed in an electrically insulating polymeric binder having one or more nitrogen-containing functional groups.

43. The composite material of claim 42 wherein the electrically insulating polymeric binder is nitrocellulose, a styrene-acrylonitrile copolymer, polyurethane, polyacrylamide or combinations thereof.

* * * * *

UNITED STATES PATENT AND TRADEMARK OFFICE

CERTIFICATE OF CORRECTION

PATENT NO. : 5,399,413

DATED : March 21, 1995

INVENTOR(S) : Boris J. KATSEN et al.

It is certified that error appears in the above-indentified patent and that said Letters Patent is hereby corrected as shown below:

Column 5, line 64: change "them" to --there-- ;

line 64: change "whim" to --white--.

Column 6, line 5: change "substram" to --substrate--;

line 7: change "them" to --there--.

Column 9, line 15: change "cream" to --create--.

Column 14, line 26, change "Carder" to --Carrier--.

Signed and Sealed this

Twenty-ninth Day of October 1996

*Attest:*

Bruce Lehman

BRUCE LEHMAN

*Attesting Officer* *Commissioner of Patents and Trademarks*